Sept. 26, 1933.　　　E. B. MOORE　　　1,928,070
VALVE
Filed Sept. 5, 1931
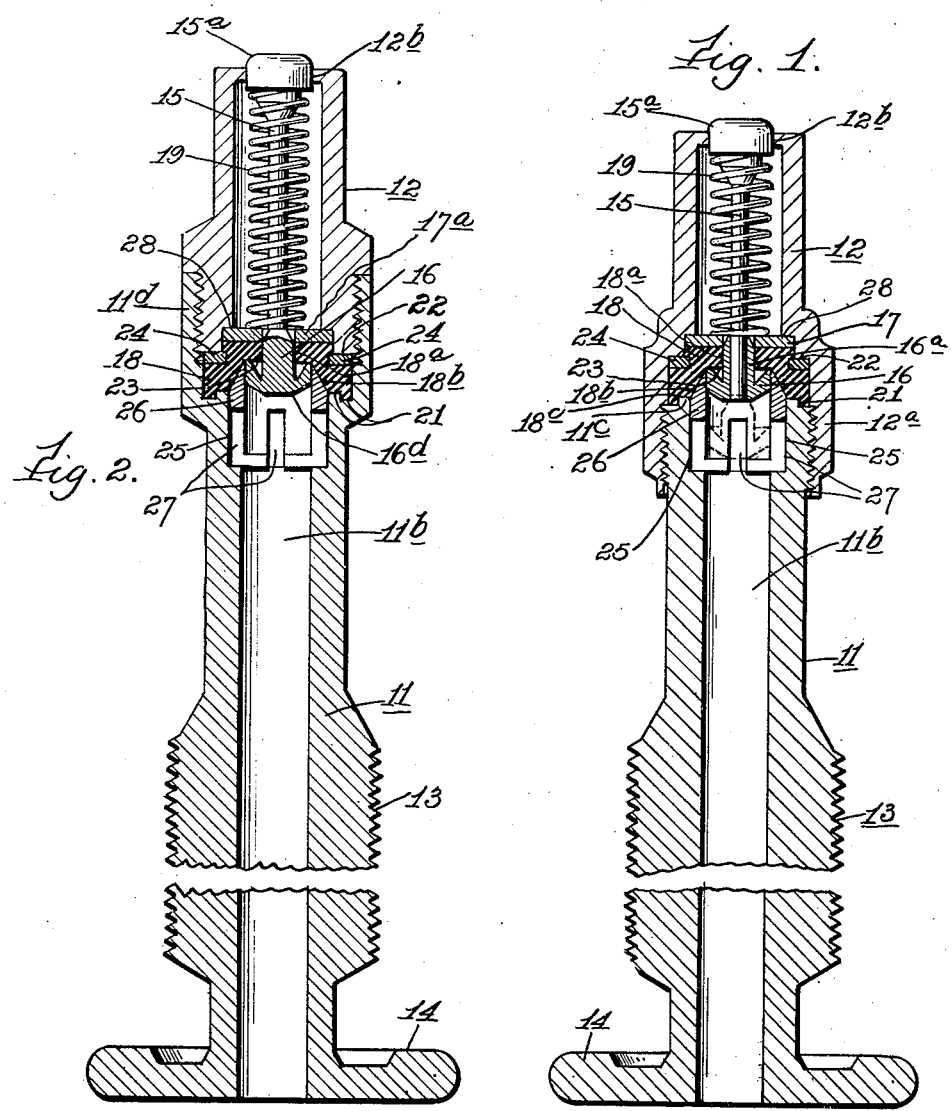
Witness.
H. C. McKnight.
Inventor.
Emmett B. Moore.
by [signature]
his Attorneys.

Patented Sept. 26, 1933

1,928,070

UNITED STATES PATENT OFFICE 1,928,070

VALVE

Emmett B. Moore, Evanston, Ill.

Application September 5, 1931. Serial No. 561,335

7 Claims. (Cl. 152—12)

The present invention pertains to a valve structure of the type particularly suitable for pneumatic tires and similar equipment, where it is desirable to supply and retain compressed air within a receptacle. More particularly this invention is directed to an improved tire valve structure of the type adapted to be embodied as permanent and original equipment. The main object of this invention is to provide an improved valve structure which is comparatively simple, positive and economical in manufacture. Another object is to provide an improved valve structure of this character which is arranged for excluding dust, dirt, etc., while being adapted for accommodating conventional types of air pressure gauges and chucks for supplying air directly to the tire or other device without the necessity of removing or adjusting any exterior protecting dust cap such as is now commonly employed for enclosing the upper end of the tire valve casing. A further object is to provide an improved valve structure of this general type constructed and arranged to permit convenient access to the valve mechanism for replacement or adjustment of the elements. A still further object of this invention is to provide an improved valve structure for pneumatic tires, etc., which is so constructed and arranged as to afford a relatively large air passageway for communicating with the interior of the tire for expediting inflation and deflation thereof. With these and other objects in view the invention consists in certain features and elements of construction in combination as herein shown and described, and as indicated by the claims.

In the drawing:

Figure 1 is a vertical, central section through a tire valve casing having a valve structure embodying the present invention.

Figure 2 is a view similar to Figure 1 showing a modified form of my invention.

Figure 3 is a perspective detail view of a washer-like element which serves to provide reinforcement for the valve seat element and a seat for the spring.

Figure 4 is a perspective view of the cup-shaped member which serves as a reinforcement of the valve seat element, and also as a stop for limiting the range of movement of the valve element.

Referring now in detail to the drawing, the tire-valve casing, as herein shown, is composed of two tubular members, 11 and 12, respectively; the lower member, 11, having an air passageway, 11b, which communicates with the interior of the pneumatic tire. It is to be understood that the major dimensions of the casing are the same as those of the conventional tire valve casing now employed. The lower casing member, 11, is of substantial length and has a threaded lower portion, indicated at 13, as in the conventional type of so-called tire "stems" now employed, and which is arranged for having threaded thereon a suitable clamping nut, not shown. The lower end of the casing member, 11, is formed with a flange, 14, which is adapted to be inserted through an opening in the inner tube of the pneumatic tire for clamping engagement with its inner surface in the conventional manner well understood in the art. The upper end of the casing member, 11, is threaded for engagement interiorly of the skirted portion, 12a, of the upper tubular casing member, 12.

Disposed substantially within the upper casing member, 12, is the reciprocable valve mechanism assembly which includes a stem, 15, the upper end of which is provided with a rigid head, 15a; said head being dimensioned to be freely movable through and to substantially occupy the inlet port opening indicated at 12b, formed in the outer end of the upper tubular casing member, 12. Rigidly secured on the lower end of the stem is a valve element, 16, which may be understood to be attached to said stem after the reinforcing member, 17, and the coil spring, 19, have been assembled thereon. The reinforcing member, 17, is a metal disk of annular form and is adapted to be seated on the upper surface of the valve seat element, 18. The valve seat element, which is of annular form, is preferably constructed of relatively resilient material, such as soft rubber, so as to insure a more perfect seal with the under-cut head of the valve element, 16, which controls the effective port opening indicated at 18a, located centrally in said valve seat element, and through which port opening the valve stem, 15, reciprocates. The reinforcing element thus tends to prevent excess distortion of the valve seat element and assists in maintaining an open port passage, 18a, while also providing a seat for the coil spring, 19, which circumscribes the stem and reacts between the under side of the head, 15a, and the reinforcing element for holding the valve at closed position. The reinforcing element also prevents the spring from cutting into the rubber valve seat element, and also permits removal and replacement of the rubber seat element from the valve assembly without displacing or removing the coil spring from the valve stem.

The resilient valve seat element, 18, is firmly anchored in position in the tire valve casing by having its outer margin embraced between opposing transverse shoulders, 21 and 22, of the tubular casing members, 11 and 12, respectively.

In using relatively soft rubber or like material for the valve seat element it has been found desirable to employ some reinforcement adjacent this marginal portion, preferably in alignment with the opposing shoulders so as to substantially reduce the section of rubber at said marginal edge, and thereby to a substantial extent prevent distortion of the valve seat proper, indicated at 23, as well as the port opening, 18ª, which would normally result by the inward flow of the resilient material due to the pressure exerted at the marginal edges thereof when the casing members, 11 and 12, are threaded together. For this purpose I have molded in said marginal flange of the valve seat element an annular metallic reinforcing member indicated at 24, which, as may be seen in the drawing, has its inner edge embraced in a grooved portion of said valve seat element, 18.

It is to be understood that the spring or the valve seating means of the valve assembly might be positioned below the valve element, reacting between the underside of the valve element and the bottom of the cup-shaped member, 26; said member being lengthened sufficiently to accommodate the coil spring. Since the air in the tire becomes hot from friction and absorption of heat from the road and tends to take the temper out of the spring, I prefer to place the spring above the valve, out of the air in the tire.

The upper end of said lower casing member, 11, is counterbored, as indicated at 25, and seated in said counterbore is a cup-shaped member, 26, which is positioned and dimensioned to provide a snug guiding fit for the valve element, 16, as it moves to and from open position. This cup-shaped element is provided with a plurality of transversely extending slots, indicated at 27, which cut through the bottom and extend a substantial distance upwardly in the side walls, so that when said valve element has been moved to full open position these slots afford maximum communication between the passageway, indicated at 11ᵇ, of the lower casing member, 11, which communicates with the interior of the tire, and the upper casing member, 12. The bottom portion of the cup-shaped member, 16, also serves as a stop for the valve element for limiting the range of opening movement. This feature of construction prevents depressing the valve head so far as to cause the spring member, 19, to form a substantially solid cylinder which would tend to seal the valve port, 18ª, and which would substantially impair the flow of air therethrough during inflation and deflation of the tire. This definite stop for the valve mechanism causes the valve stem head to react against the valve in the air inflation chuck for opening the same to permit the flow of air from the chuck through the casing members into the tire. The slots in the bottom and sides of said cup member, 26, render it resilient, and adapted to be force-fitted into the counterbore, 25, at the upper end of the lower casing member, 11.

The upper portion of the cup-shaped member, 16, has its outer surface tapered so as to engage the frusto-conical wall, 18ᵇ, of the valve seat element which forms the recess surrounding the seat, 23, and thus tends to further reinforce said element so as to prevent inward flow of the rubber due to the pressure at the outer marginal edges, and thereby insures freedom of movement of the valve element at all times. The upper end of the lower casing member, 11, is formed with a reduced annular portion, 11ᶜ, which snugly fits into a recessed portion, 18ᶜ, at the under side of said valve seat element, serving to further reinforce the valve seat element and provide a more perfect seal at the joint between the casing members, 11 and 12. It is obvious that this reduced annular portion may be varied in length, as desired.

Desirably, the reinforcing member, 17, as shown, is embraced at its outer marginal edges between the upper surface of the valve seat element and the annular shoulder, 28, of the upper casing member, 12. This insures correct positioning of the valve assembly when it is first placed in said upper casing member, and prevents the air pressure in the tire from distorting the rubber valve seat and forcing the valve element through the port opening in said seat.

In the modified construction shown in Figure 2 it will be seen that the detachable connection between the casing members, 11 and 12, is substantially the reverse of that shown in Figure 1, in that the upper end of the lower casing member, 11, is provided with a flange, 11ᵈ, which is internally threaded for engagement with the upper casing member, 12. The valve structure herein is substantially identical with that disclosed in Figure 1, with the exception that the valve stem, 15, together with the head, 15ª, and valve element, 16, are formed from a single piece of material for the purpose of economical manufacture. Because of this feature of construction I employ a special form of reinforcing member, indicated at 17ª, and shown in detail in Figure 3. As may be seen in the drawing, this metal reinforcing member is substantially a disk of initially non-circular form having an aperture punched centrally therein, said aperture communicating at one side with a gap indicated at 17ᵇ, of substantial extent so as to permit its being slipped around the valve stem, 15, and then compressed so that the edges, 17ᶜ, of said gap are brought substantially into line contact, producing an annular reinforcing member. To facilitate re-shaping the reinforcing disk in this manner it has been found desirable to provide a notch, indicated at 17ᵈ, in the marginal edge of said washer at the side diametrically opposite the gap, thereby somewhat reducing the section of metal at this point, which permits the reinforcing washer to be closed without buckling.

The tire valve structure embodying this invention is simple, positive, and may be economically manufactured. It is to be understood that, as may be seen in the drawing, the external diameter of the combined casing members, at all points, is slightly less than the diameter of the root of the threads of the enlarged portion, 13, so as to permit the usual clamping washer and nut (not shown) to be freely inserted over the stem for engagement with said threaded portion, 13, for securing the stem in position on the inner tube and the felly of the wheel. When the casing parts are separated the entire valve mechanism may be removed body. The only part that may require replacement, due to wear or hardening of the rubber, is the valve seat element, 16, and this may be done very quickly by merely snapping the seat over the valve element, 16, and slipping a new one in place thereon.

By virtue of the construction as above described, it will be manifest that the effective air passageway is substantially greater than that now found in the conventional type of tire valve structures, and naturally the matter of inflating and deflating tires will be considerably expedited, in addition to the time which normally will be saved by virtue of the fact that it is unnecessary to remove or adjust any dust caps or other structures which are commonly employed for protection of the upper ends of the tire valve casings. This is of great importance in garages or where a fleet of motor vehicles are operated, and it is the duty of some person or persons to check up the pressures in tires of all the vehicles, and when necessary to inflate or deflate the same; consequently the use of my device will result in a substantial saving in time and labor.

While there are shown and described herein certain specific structures embodying the invention, it will be manifest to those skilled in the art that various modifications and re-arrangements of the parts may be made without departing from the spirit and the scope of the invention, and that the same is not limited to the particular form herein shown and described, except in so far as indicated by the appended claims.

I claim:

1. A valve structure for pneumatic tires and the like including a casing consisting of two tubular members adapted to be detachably connected together, one of said members being arranged for direct communication with the interior of the tire, reciprocable valve mechanism assembled as a unit and disposed in said casing, said mechanism including a stem, a valve element rigidly united with the lower portion of the stem and a head rigidly secured to the upper end of the stem and dimensioned to be freely movable through and substantially occupy the inlet port opening provided at the outer end of said other casing member, a valve seat element of resilient material having its marginal edges firmly gripped between opposing shoulders of said casing members, a reinforcing member in the nature of a split washer adapted to be fitted about said stem and forced together, and disposed on the upper side of the valve seat element opposite the effective valve seat, and spring means for maintaining the valve element at seated position, whereby separation of the casing members permits bodily removal of said valve mechanism as a unit.

2. In a valve structure for pneumatic tires and the like including a casing consisting of two tubular members connected together, one of said members being arranged for direct communication with the interior of the tire, and reciprocable valve mechanism disposed in said casing members and including a stem having a head at its upper end adjacent the opening at the outer end of the other casing part, a valve element at the lower portion of the stem, a valve seat element of resilient material for said valve having its marginal edges firmly gripped between opposing shoulders of said casing members, a spring for holding the valve seated; and a cup-shaped member seated in the upper end of said first mentioned casing member in position for receiving and guiding said valve member throughout its reciprocatory movement, said cup-shaped member including a transverse surface serving to limit the range of movement of said valve element in opening direction.

3. In the construction defined in claim 2, said cup-shaped member having an opening affording communication of the air passageway in the first mentioned casing member with the other casing member when the valve element is in open position.

4. In the construction defined in claim 2, the lower portion of said cup-shaped member having a plurality of slots, rendering it resilient for forcibly fitting in the recessed upper end of the first mentioned casing member, and also affording communication between said casing members when the valve element is in open position.

5. In a valve structure for pneumatic tires and the like including a casing consisting of two tubular members connected together, one of said members being arranged for direct communication with the interior of the tire, and reciprocable valve mechanism disposed substantially in the other casing member and including a stem having a head at its upper end adjacent the opening at the outer end of said other casing member, a valve element at the lower end of the stem, a valve seat element of resilient material for said valve having its marginal edges firmly gripped between opposing shoulders of said casing members, and a spring holding the valve seated; a cup-shaped member seated in the upper end of said first mentioned casing member and having a transverse surface serving to limit the movement of said valve element in opening direction, the upper portion of said cup-shaped member being formed for engaging the wall forming the recess leading to the valve port in the under side of the valve seat element for reinforcing said valve seat element and preventing the flow of the material, of which said seat element is composed, in an inwardly direction when the marginal edges thereof are gripped between said opposing shoulders of the casing members.

6. As an article of manufacture, a replaceable valve seat element of resilient material and of annular formation having one side formed with a recess or a well terminating in a flat transverse area to provide the effective valve seat, and having a centrally located aperture forming the effective valve port arranged for accommodating a reciprocable valve stem therein, the outer marginal flange of said element having a rigid metal reinforcement permanently associated therewith.

7. As an article of manufacture, a replaceable valve seat element of resilient material and of annular outline, having one side formed with a conical recess or well terminating in a flat transverse area to provide the effective valve seat, and having a centrally located aperture for accommodating a reciprocable valve stem, and the outer marginal flange of said element having a reinforcement of annular form molded therewith as a permanent part thereof.

EMMETT B. MOORE.